US012597798B2

(12) United States Patent
Matsui

(10) Patent No.: US 12,597,798 B2
(45) Date of Patent: Apr. 7, 2026

(54) REDUNDANT POWER SUPPLY SYSTEM

(71) Applicant: TOYOTA JIDOSHA KABUSHIKI KAISHA, Toyota (JP)

(72) Inventor: Megumi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/968,481

(22) Filed: Dec. 4, 2024

(65) Prior Publication Data

US 2025/0293539 A1 Sep. 18, 2025

(30) Foreign Application Priority Data

Mar. 14, 2024 (JP) ................................. 2024-039926

(51) Int. Cl.
*H02J 9/06* (2006.01)
*B60R 16/03* (2006.01)

(52) U.S. Cl.
CPC .............. *H02J 9/061* (2013.01); *B60R 16/03* (2013.01)

(58) Field of Classification Search
None
See application file for complete search history.

(56) References Cited

U.S. PATENT DOCUMENTS

| | | | |
|---|---|---|---|
| 2018/0345931 A1* | 12/2018 | Harries | B60T 8/885 |
| 2020/0408301 A1* | 12/2020 | Scheiblecker | F16H 63/3491 |
| 2021/0402939 A1* | 12/2021 | Obayashi | B60R 16/033 |
| 2022/0166249 A1* | 5/2022 | Shindo | B60R 16/033 |
| 2022/0368153 A1* | 11/2022 | Hakushima | H02J 9/061 |
| 2023/0155411 A1* | 5/2023 | Matsumoto | B60L 3/0046 307/23 |

FOREIGN PATENT DOCUMENTS

JP 2022-161163 A 10/2022

* cited by examiner

*Primary Examiner* — Daniel Cavallari
*Assistant Examiner* — Joel Barnett
(74) *Attorney, Agent, or Firm* — SoraIP, Inc.

(57) ABSTRACT

A redundant power supply system comprising: a sub power supply; a first circuit; a second circuit for supplying power of the sub power supply to the plurality of loads; and a control unit for controlling operations of the first circuit and the second circuit based on a state of the main power supply, wherein the control unit operates only the first circuit when there is no failure notification of the main power supply from the plurality of loads, and when there is no failure notification of the main power supply from the first load, and when there is a failure notification of the main power supply from the second load, which is one of the plurality of loads, operates only the second circuit, and then operates the first circuit when the voltage of the sub power supply decreases to a predetermined lower limit voltage.

2 Claims, 3 Drawing Sheets

REDUNDANT POWER SUPPLY SYSTEM

CROSS-REFERENCE TO RELATED APPLICATION

This application claims priority to Japanese Patent Application No. 2024-039926 filed on Mar. 14, 2024, incorporated herein by reference in its entirety.

BACKGROUND

1. Technical Field

The present disclosure relates to a redundant power supply system that backup-supplies power from a sub power supply to a plurality of loads when a main power supply fails.

2. Description of Related Art

Japanese Unexamined Patent Application Publication No. 2022-161163 (JP 2022-161163 A) discloses a redundant power supply system capable of backup-supplying power from a sub power supply to a plurality of loads (shift-by-wire, brake, door unlocking) in place of a main power supply that is mounted in a vehicle and supplies power to the plurality of loads when the main power supply fails.

SUMMARY

Switching of a power supply source from the main power supply to the sub power supply is based on a failure determination of the main power supply in each of the plurality of loads. However, the failure determination of the main power supply varies due to various factors (such as design values of the loads, wiring lengths from the main power supply to the loads, and detection errors). Therefore, a case in which some loads determine that the main power supply has failed while other loads determine that the main power supply has not failed may occur.

In the redundant power supply system as in JP 2022-161163 A, safety of the vehicle is prioritized. Therefore, once the failure determination of the main power supply is made by at least one load and backup is determined to be necessary, backup control for supplying power from the sub power supply is started. However, there may be a case where a specific load that cannot made failure determination of the main power supply is continuously present even after the backup control is started (for example, a case where a voltage does not drop to a determination criterion of a specific load). Since the specific load continues normal control, there is a possibility that movement (such as behaviors of the vehicle and state transition) to be performed in the backup control cannot be executed.

The present disclosure provides a redundant power supply system capable of supplying power to loads to perform movement to be performed in backup control when there is a load that does not made failure determination of a main power supply even after other loads make failure determination of the main power supply.

One aspect of the disclosed technology is a redundant power supply system that backup-supplies power to a plurality of loads when a main power supply fails, the redundant power supply system including:

a sub power supply;

a first circuit configured to supply power of the main power supply to a first load which is one of the plurality of loads;

a second circuit configured to supply power of the sub power supply to the plurality of loads; and a control unit configured to control operations of the first circuit and the second circuit based on a state of the main power supply, in which the control unit causes only the first circuit to operate when there is no failure notification of the main power supply from the plurality of loads, and causes only the second circuit to operate and then causes the first circuit to operate once a voltage of the sub power supply drops to a predetermined lower limit voltage when there is no failure notification of the main power supply from the first load and there is a failure notification of the main power supply from a second load which is one of the plurality of loads.

According to the redundant power supply system of the present disclosure, the main power supply and the first load are connected (the first circuit is caused to operate) in a case where the voltage of the sub power supply drops to a lower limit voltage without failure determination of the main power source made by the first load after the power supply source is changed to the sub power supply (the second circuit is caused to operate) based on failure determination of the main power supply made by the second load other than the first load. The first load can thus execute movement to be performed in backup control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the redundant power supply system according to the present disclosure, after the power supply source is switched from the main power supply to the sub power supply according to the determination of the failure of the main power supply due to the brake or the like, when the sub power supply is in a state in which backup is impossible without determining the failure of the main power supply due to the shift-by-wire, the power is supplied from the main power supply to the shift-by-wire in a pass-through manner. Accordingly, the shift-by-wire can perform the parking lock operation by the main power supply even when the sub power supply is exhausted.

Hereinafter, an embodiment of the present disclosure will be described in detail with reference to the drawings.

Embodiment

Configuration

Figure 1:
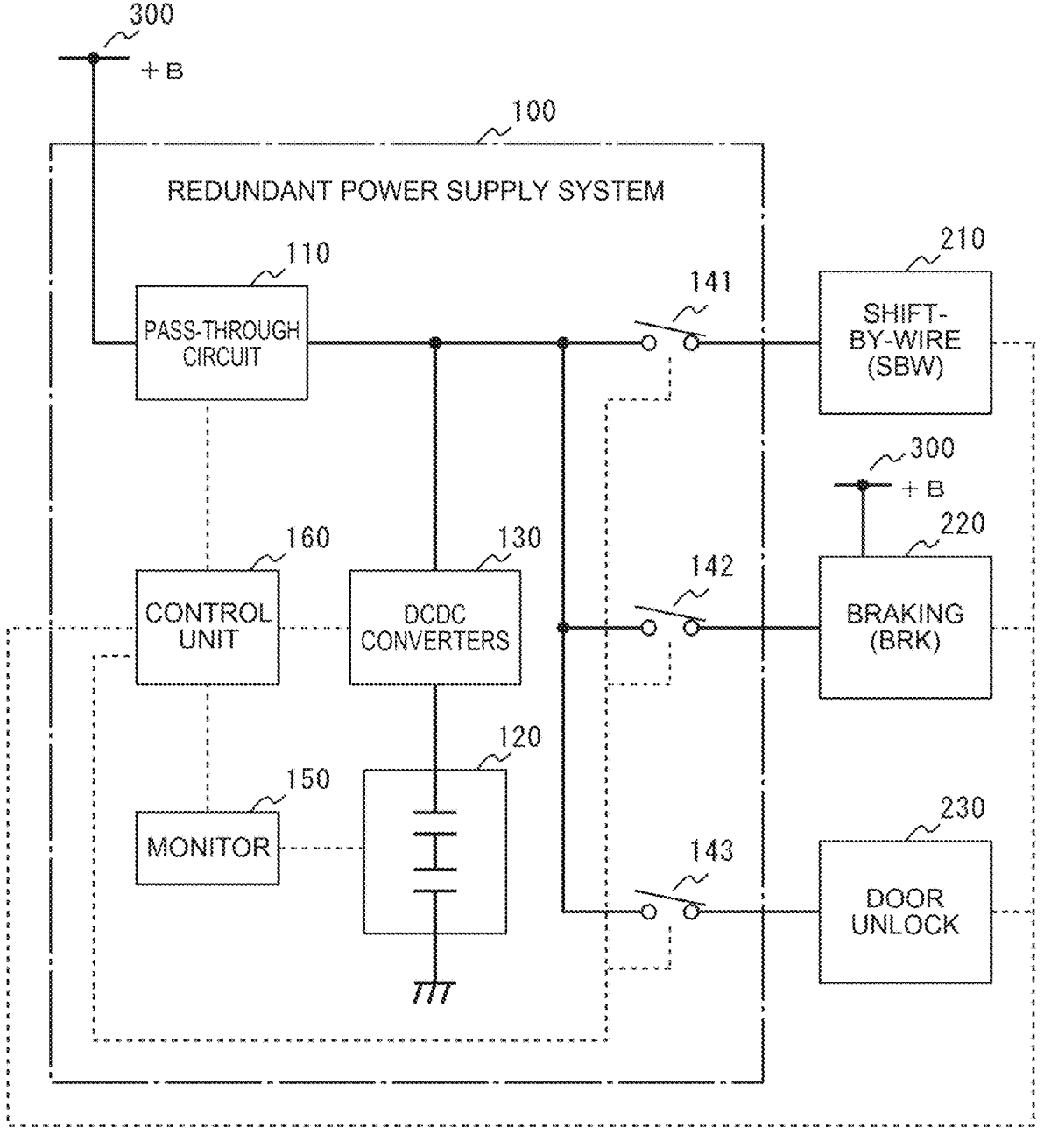
FIG. 1 is a functional block diagram of a redundant power supply system and a peripheral portion thereof according to an embodiment of the present disclosure.

FIG. 1 is a functional block diagram of a redundant power supply system 100 and a peripheral portion thereof according to an embodiment of the present disclosure. The functional blocks illustrated in FIG. 1 include a redundant power supply system 100, a shift-by-wire (SBW) 210, a brake (BRK) 220, and a door unlock 230. In FIG. 1, the power lines through which power is transmitted and received are indicated by solid lines, and the signal lines through which control instructions, notifications, detection values, and the like are transmitted and received are indicated by dotted lines. The redundant power supply system 100, the shift-by-wire 210, the brake 220, and the door unlock 230 are mounted on a vehicle or the like.

The main power supply 300 is a power supply that supplies power of a predetermined voltage (+B voltage) to the redundant power supply system 100, the shift-by-wire 210, the brake 220, and the door unlock 230. The main power supply 300 includes a secondary battery configured to be chargeable and dischargeable, such as a lithium-ion battery or a lead-acid battery.

The redundant power supply system 100 is a unit that functions as an auxiliary power supply for backing up power to the shift-by-wire 210, the brake 220, and the door unlock 230 when an abnormality occurs in power supply from the main power supply 300 to the shift-by-wire 210, the brake 220, and the door unlock 230 due to, for example, a power failure of the main power supply 300. The redundant power supply system 100 includes a pass-through circuit 110, a sub power supply 120, a DCDC converter 130, a plurality of switches 141 to 143, a monitor 150, and a control unit 160.

The pass-through circuit 110 is connected to the main power supply 300 and is configured to supply the power of the main power supply 300 to the shift-by-wire 210 and the door unlock 230. The pass-through circuit 110 typically includes a switch element such as a semiconductor relay. The pass-through circuit 110 switches the electrical connection state between the main power supply 300 and the shift-by-wire 210 and the door unlock 230 by controlling conduction/disconnection of the switch element based on an instruction from the control unit 160.

The sub power supply 120 is a power supply source configured by, for example, a storage element such as a capacitor or a secondary battery such as a lithium-ion battery configured to be chargeable and dischargeable. The sub power supply 120 is connected to DCDC converters 130 so as to be able to charge the electric power inputted from the main power supply 300 via the pass-through circuit 110. The sub power supply 120 is connected to DCDC converters 130 so that the electric power (backup power) stored therein can be discharged to the shift-by-wire 210, the brakes 220, and the door unlock 230.

DCDC converter 130 is a power converter for controlling charging and discharging of the power of the sub power supply 120. DCDC converters 130 can convert the electric power inputted from the main power supply 300 via the pass-through circuit 110 into electric power of a predetermined voltage and output the electric power to the sub power supply 120 based on an instruction from the control unit 160. In addition, DCDC converters 130 can convert the electric power stored in the sub power supply 120 into electric power of a predetermined voltage and output the electric power to the shift-by-wire 210, the brakes 220, and the door unlock 230.

Each of the plurality of switches 141 to 143 includes a switch element such as a normally-off type semiconductor relay. The plurality of switches 141 to 143 are respectively inserted between the power line to which the pass-through circuit 110 and DCDC converter 130 are connected, the shift-by-wire 210, the brake 220, and the door unlock 230. The switches 141 to 143 are conduction controlled so that the backup power of the sub power supply 120 is supplied to the shift-by-wire 210, the brake 220, and the door unlock 230 when the redundant power supply system 100 performs backup control based on an instruction from the control unit 160.

In the above-described redundant power supply system 100, the pass-through circuit 110 constitutes a first circuit, and the sub power supply 120, DCDC converters 130, and the switches 141 to 143 constitute a second circuit.

The monitor 150 is a configuration for detecting the state of the sub power supply 120. The monitor 150 typically includes a sensor that detects a physical quantity such as a voltage, a current, and a storage amount as a state of the sub power supply 120. The state of the sub power supply 120 detected by the monitor 150 is acquired by the control unit 160.

The control unit 160 is configured to control the operations of the pass-through circuit 110, DCDC converters 130, and the switches 141 to 143 based on the status of the sub power supply 120 acquired from the monitor 150 to realize backup-supply of power by the redundant power supply system 100. A microcomputer or the like is used as the control unit 160.

The shift-by-wire (SBW) 210, the brake 220 (BRK), and the door unlock 230 are in-vehicle loads for implementing predetermined functions related to vehicles, and are devices (or systems) that require a particularly redundant power supply configuration. Note that the plurality of devices mounted on the vehicle is not limited to those illustrated in FIG. 1.

The shift-by-wire (SBW) 210 is a device (first load) that performs shift-by-wire control in which a gear stage of a transmission (not shown) can be changed by an electric signal. The shift-by-wire 210 operates (normally controls) with power (+B pass-through power) supplied from the main power supply 300 via the pass-through circuit 110 of the redundant power supply system 100 when the main power supply 300 is normal. When the main power supply 300 fails, the shift-by-wire 210 operates with power supplied from the sub power supply 120 via DCDC converters 130 (backup control). In addition, the shift-by-wire 210 can determine that the main power supply 300 has failed when the voltage (+B voltage) applied from the main power supply 300 is equal to or lower than a predetermined first threshold value. If it is determined that the main power supply 300 has failed, the shift-by-wire 210 sends a notification (failure notification) to the control unit 160 of the redundant power supply system 100 that the main power supply 300 has failed.

A brake (BRK) 220 is a device (second load) that performs brake control capable of generating a braking force on vehicles. When the main power supply 300 is normal, the brake 220 operates with electric power supplied directly from the main power supply 300 (normal control). When the main power supply 300 fails, the brake 220 operates with electric power supplied from the sub power supply 120 via DCDC converter 130 (backup control). In addition, the brake 220 can determine that the main power supply 300 has failed when the voltage (+B voltage) applied from the main power supply 300 is equal to or lower than a predetermined second threshold value. When determining that the main power supply 300 has failed, the brake 220 transmits a notification (failure notification) indicating that the main power supply 300 has failed to the control unit 160 of the redundant power supply system 100.

The door unlock 230 is a device (second load) that performs door locking and unlocking control that can lock and unlock the vehicle door by an electric signal. The door unlock 230 operates (normally controls) with power (+B pass-through power) supplied from the main power supply 300 via the pass-through circuit 110 of the redundant power supply system 100 when the main power supply 300 is normal. When the main power supply 300 fails, the door unlock 230 operates with electric power supplied from the sub power supply 120 via DCDC converters 130 (backup control). Further, the door unlock 230 can determine that the main power supply 300 has failed when the voltage (+B voltage) applied from the main power supply 300 is equal to or lower than a predetermined third threshold value. When it is determined that the main power supply 300 has failed, the door unlock 230 transmits a notification (failure notification) indicating that the main power supply 300 has failed to the control unit 160 of the redundant power supply system 100.

In the present embodiment, it is assumed that the first threshold value at which the shift-by-wire 210 determines the failure of the main power supply 300 is set to be lower than the second threshold value and the third threshold value at which the brake 220 and the door unlock 230 determine the failure of the main power supply 300. In this scenario, a failure determination of the main power supply 300 may be made in the brake 220 or the door unlock 230, while a failure determination of the main power supply 300 may not be made in the shift-by-wire 210.

Therefore, the redundant power supply system 100 performs the following operations in order to cope with the situation where such failure determination is different.

Operation

Figure 2:
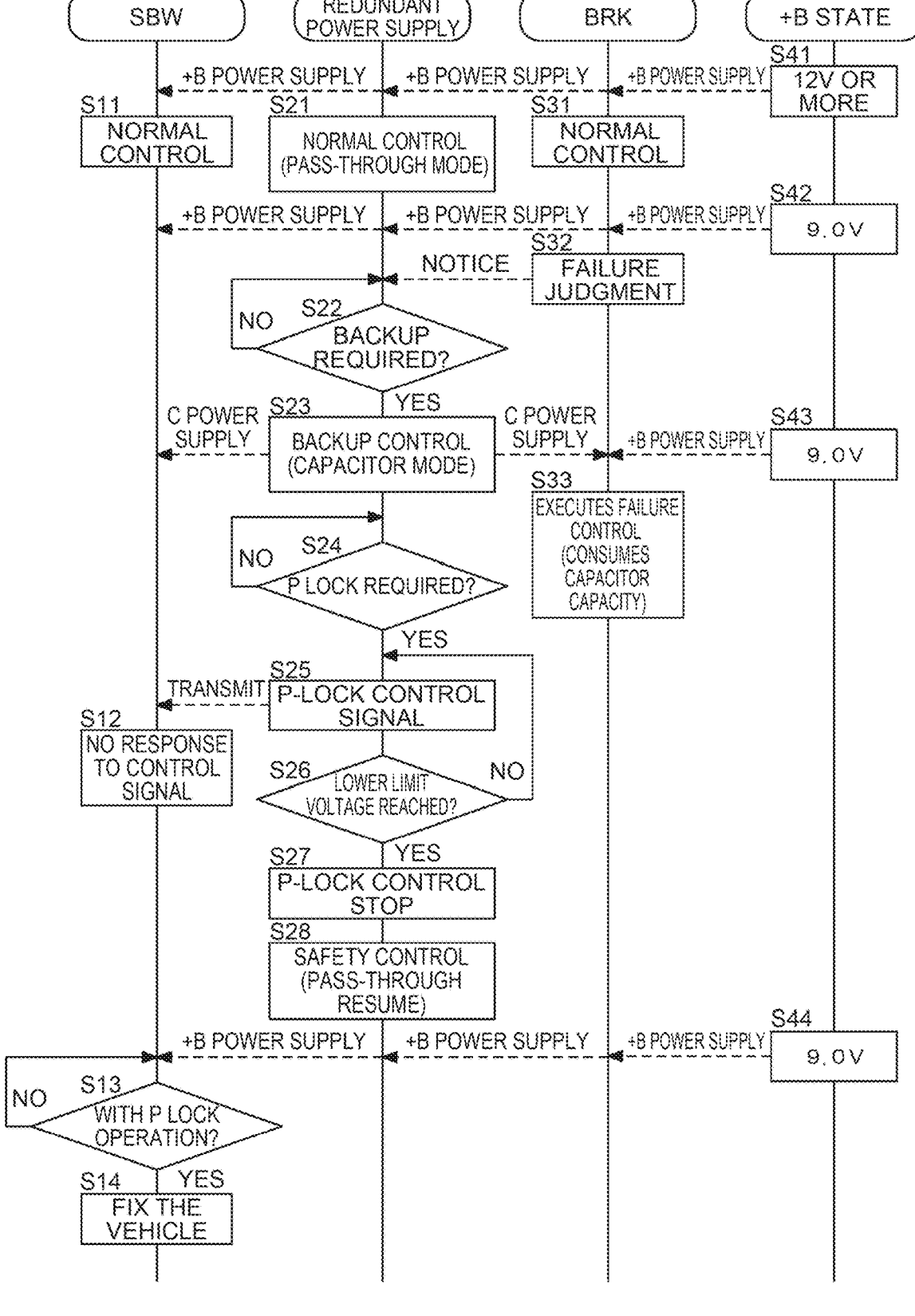
FIG. 2 is a sequence of operations illustrating the movement of a redundant power supply system, a shift-by-wire, and a brake in the event of a failure of the main power supply.

With further reference to FIG. 2, the operation of the redundant power supply system 100 according to an embodiment of the present disclosure will now be described. FIG. 2 is an operational sequence illustrating the respective movements of the redundant power supply system 100, the shift-by-wire (SBW) 210, and the brake (BRK) 220 in the event of a failure of the main power supply 300. Since the operation of the door unlock 230 is basically the same as that of the brake 220, the operation is omitted in FIG. 2.

In the operation shown in FIG. 2, a scene is described in which the shift-by-wire 210 turns 8.5 V the first threshold value for determining the failure of the main power supply 300, the brake 220 turns 9.4 V the second threshold value for determining the failure of the main power supply 300, and then the state (+B state) of the main power supply 300 decreases from the voltage 12 V or higher to the voltage 9.0 V.

(1) Phase 1: Main Power Supply is Normal

When the main power supply 300 is in a normal condition (S41), power equal to or higher than the voltage 12 V is supplied (+B power supply) from the main power supply 300 to the redundant power supply system 100, the shift-by-wire 210, and the brake 220. The shift-by-wire 210 performs normal control because the voltage of the +B feed is greater than or equal to 12 V (>first threshold) (S11). In addition, since the voltage of the +B power supply is equal to or higher than 12 V value (>second threshold value), the brake 220 executes the normal control (S31). The redundant power supply system 100 performs normal control (pass-through mode) because there is no failure notification of the main power supply 300 from the shift-by-wire 210 and the brakes 220 (S21).

(2) Phase 2: Main Power Supply Error

If a fault occurs in the main power supply 300 that drops to a voltage 9.0 V (S42), the power of the voltage 9.0 V is supplied (+B fed) from the main power supply 300 to the redundant power supply system 100, the shift-by-wire 210, and the brake 220. The shift-by-wire 210 continuously performs the normal control because the voltage of the +B power supply is equal to or higher than 9.0 V (>first threshold). On the other hand, since the voltage of the +B power supply is 9.0 V (<second threshold), the brake 220 determines that a failure has occurred in the main power supply 300 (S32). Based on this determination, the brake 220 notifies the redundant power supply system 100 of a failure of the main power supply 300. The redundant power supply system 100 determines that backup to the brake 220 is required (S22, Yes) because there was a failure notification of the main power supply 300 from the brake 220.

(3) Phase 3: Transition From Normal Control to Backup Control

The redundant power supply system 100 performs the backup control (capacitor mode) in response to determining that backup to the brakes 220 is required (S23). In this backup control, the redundant power supply system 100 shuts off the pass-through circuit 110 and conducts the switches 141 through 143. Backup power (equal to or greater than 12 V) is supplied from the sub power supply 120 to the shift-by-wire 210 and the brake 220 via DCDC converters 130 (C power supply).

The brake 220 that notifies the redundant power supply system 100 of the failure of the main power supply 300 requires power to perform three braking operations to generate a braking force on the vehicle in order to safely shut down the vehicle (S33). This required power is consumed from the sub power supply 120 (consumption of the capacitor capacitance).

(4) Phase 4: P-Lock Control (Origin)

After starting the backup control (capacitor mode), the redundant power supply system 100 determines whether or not the shift of the vehicle needs to be locked in the parking position (hereinafter referred to as "P-lock") (S24). This determination is made based on the capacity (lower limit capacity) of the sub power supply 120. Typically, it is determined appropriately based on conditions such as whether or not the capacity required for the failure control in the brake 220 has been consumed from the sub power supply 120, and whether or not the capacity required for executing the P-lock remains in the sub power supply 120.

If the redundant power supply system 100 determines that a P-lock is required (S24, Yes), it transmits a P-lock control signal (e.g., a PWM signal having a predetermined duty cycle) to the shift-by-wire 210 that instructs the P-lock to be executed (S25). The P-lock control signal is repeatedly transmitted until the voltage of the sub power supply 120 reaches the lower limit voltage (PWC detection limit voltage) that can be backed up, that is, until the capacitance of the sub power supply 120 drops to a level that is worth exhaustion (S26).

On the other hand, since the shift-by-wire 210 is operating under normal control, it does not respond to receiving the P-lock control signal from the redundant power supply system 100, i.e., it S12 control without P-locking the shift.

When the voltage of the sub power supply 120 reaches the lower limit voltage of the backup control (S26, Yes), the redundant power supply system 100 stops transmitting the P-lock control signal (S27). The redundant power supply system 100 then S28 safety control to conduct the pass-through circuit 110.

(5) Phase 5: Pass-Through Circuit Restart

When the pass-through circuit 110 is conductively controlled by the redundant power supply system 100, the power of the voltage 9.0 V is supplied (+B fed) from the main power supply 300 to the shift-by-wire 210 and the brake 220 again via the pass-through circuit 110 (S44). This resumption of the powering of the voltage 9.0 V by the pass-through allows the shift-by-wire 210 to operate in response to a manual P-lock action, such as by a driver.

The shift-by-wire 210 determines whether or not a manual P-lock operation has been performed by a driver of the vehicle or the like (S13). When a P-lock operation is manually performed, the shift-by-wire 210 locks the shift to the parking position and fixes the vehicle (S14).

As described above, in the redundant power supply system 100 according to the present embodiment, when the shift-by-wire 210 does not respond to the P-lock control signal transmitted to the shift-by-wire 210 during the backup control, the pass-through circuit 110 that has been interrupted by the backup control is made conductive again and applied to the shift-by-wire 210. By this control, if the voltage at the time of failure of the main power supply 300 is the operable voltage of the shift-by-wire 210, the shift can be P-locked in response to a P-lock operation by hand. Therefore, it is possible to avoid that the backup power of the sub power supply 120 is lost and the P lock becomes impossible.

Application Action

Figure 3:
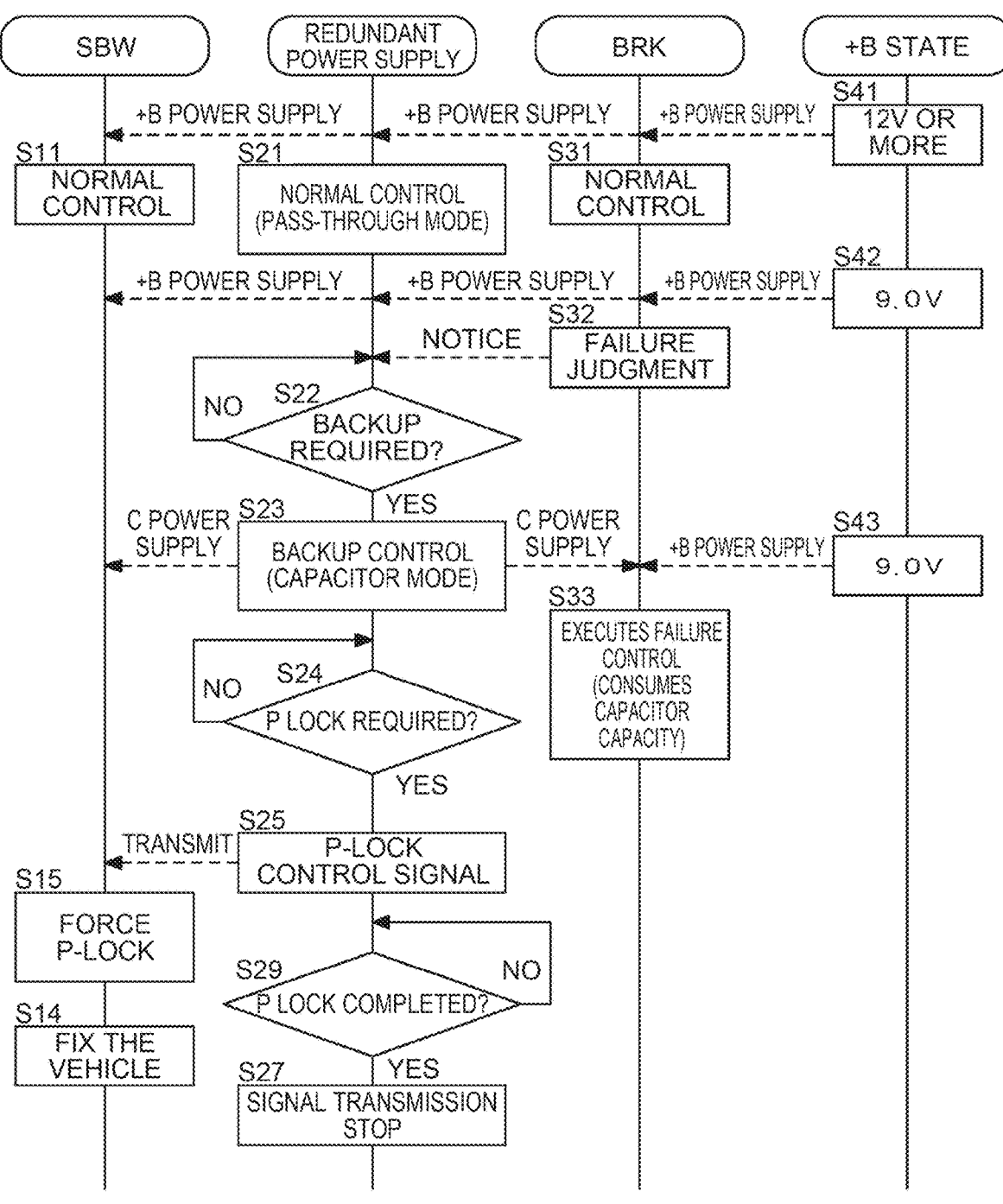
FIG. 3 is an operational sequence of an application describing the movement of a redundant power supply system, shift-by-wire, and brake in the event of a failure of the main power supply.

FIG. 3 is an operational sequence illustrating the applied movement of each of the redundant power supply system 100, the shift-by-wire (SBW) 210, and the brake (BRK) 220 in the event of a failure of the main power supply 300.

The applied operation shown in FIG. 3 is the same in the first phase, the second phase, and the third phase as compared with the operation shown in FIG. 2, and is different in the fourth phase and the subsequent phases. Therefore, the different fourth and subsequent phases will be described below.

(4') Phase 4: P-Lock Control (Forced)

After starting the backup control (S23), the redundant power supply system 100 determines whether the shifting of the vehicles needs to be P-locked (S24). This determination is made based on the capacity (lower limit capacity) of the sub power supply 120. Typically, it is determined appropriately based on conditions such as whether or not the capacity required for the failure control in the brake 220 has been consumed from the sub power supply 120, and whether or not the capacity required for executing the P-lock remains in the sub power supply 120.

If the redundant power supply system 100 determines that a P-lock is required (S24, Yes), it transmits a P-lock control signal to the shift-by-wire 210 indicating that a P-lock is to be performed (S25). Here, the shift-by-wire 210 is designed in advance to forcibly P-lock the shift when the P-lock control signal is received from the redundant power supply system 100, regardless of whether the control being executed by itself is the normal control or the backup control. Thus, in this applied operation, the shift-by-wire 210 locks the shift P if it receives a P-lock control signal from the redundant power supply system 100 (S15). Thus, the vehicles are fixed (S14). In response to the completion of the P-lock of the shift (S29, Yes), the redundant power supply system 100 stops transmitting the P-lock control signal (S27).

In the above-described application operation, by designing the shift-by-wire 210 in advance so as to forcibly lock the shift P when the P-lock control signal is received regardless of the control state, the shift P can be automatically locked at a necessary timing without exhausting the sub power supply 120.

Operations and Effects

As described above, according to the redundant power supply system 100 according to the embodiment of the present disclosure, in the configuration in which the +B voltage of the main power supply 300 is applied to the shift-by-wire 210 via the pass-through circuit 110, when there is no failure notification of the main power supply 300 from the shift-by-wire 210 and there is a failure notification of the main power supply 300 from the brake 220 or the door unlock 230, the voltage application from the pass-through circuit 110 is resumed when the voltage of the sub power supply 120 is lowered to the lower limit voltage that can be backed up while giving priority to the application of the backup voltage by the sub power supply 120.

With this control, when the failure of the main power supply 300 is such a failure that the voltage level at which the shift-by-wire 210 can be operated can be maintained, as much power as possible can be supplied from the main power supply 300 to the shift-by-wire 210. The failure to maintain the voltage level at which the shift-by-wire 210 can operate is, for example, a voltage drop due to deterioration of a battery that is the main power supply 300, a voltage drop due to an increase in an on-vehicle load using the main power supply 300 as a power source, or the like. Therefore, even if the sub power supply 120 is depleted, the shift-by-wire 210 can perform a P-lock operation based on manual operation due to the +B voltage reapplied from the main power supply 300.

Further, according to the redundant power supply system 100 of the present embodiment, if the shift-by-wire 210 is provided with a function of forcibly locking the shift P in response to the P lock control signal in advance, the shift P can be easily locked using the P lock control signal.

An embodiment of the present disclosure has been described above. However, the present disclosure can be regarded as not only a redundant power supply system but also a control method performed by a control unit of the redundant power supply system, a program of the control method, a computer-readable non-transitory storage medium storing the program, a vehicle including a power supply system, and the like.

The redundant power supply system of the present disclosure can be used in a case where it is desired to back up power from a sub power supply to a plurality of loads when a main power supply fails.

What is claimed is:

1. A combination of a redundant power supply system, a shift-by-wire device, a brake, and a main power supply, the combination comprising:

the shift-by-wire device configured to change a gear stage of a transmission of a vehicle by sending an electric signal;

the brake configured to generate a braking force on the vehicle; and the redundant power supply system including a pass-through circuit, a sub power supply, a converter, a first switch, a second switch, a monitor, and a microcomputer, the pass-through circuit including a semiconductor relay, the converter being configured to control charging and discharging of power of the sub power supply, and the monitor being configured to detect a voltage of the sub power supply, wherein the main power supply, the pass-through circuit, and the shift-by-wire device are connected by a first power line in series, the first switch is provided on the first power line between the pass-through circuit and the shift-by-wire device, the brake is connected to the pass-through circuit in parallel by a second power line, the second power line being connected to the first power line between the pass-through circuit and the first switch, the second switch is provided on the second power line between the pass-through circuit and the brake, the converter and the sub power supply are connected to the pass-through circuit in parallel by a third power line, the third power line being connected to the first power line between the pass-through circuit and the second power line, and the converter and the sub power supply being provided on the third power line in series, the shift-by-wire device is configured to determine that the main power supply has failed in a case where a voltage applied from the main power supply to the shift-by-wire device is equal to or lower than a first threshold value, and send a first failure notification indicating that the main power supply has failed to the microcomputer, the brake is configured to determine that the main power supply has failed in a case where a voltage applied from the main power supply to the brake is equal to or lower than a second threshold value, and send a second failure notification indicating that the main power supply has failed to the microcomputer, the second threshold value being larger than the first threshold value, the microcomputer is configured to perform following processes in the order of (i) to (vi) in response to having received only the second failure notification:

(i) shutting off the pass-through circuit by turning off the semiconductor relay, (ii) turning on the first switch and the second switch, (iii) controlling the converter to cause the power to be supplied from the sub power supply to the shift-by-wire device and the brake, (iv) transmitting a P-lock control signal to the shift-by-wire device in a case where the voltage of the sub power supply is larger than a lower limit voltage, the P-lock control signal controlling a shift of the vehicle such that the shift is locked in a parking position, (v) stopping transmitting the P-lock control signal in a case where the voltage of the sub power supply is equal to the lower limit voltage, and (vi) turning on the semiconductor relay of the pass-through circuit, and the shift-by-wire device is further configured to not respond to the P-lock control signal, and lock the shift in the parking position only in response to the shift having been manually operated to the parking position by a driver of the vehicle.

2. The combination according to claim 1, wherein the lower limit voltage is set based on power required to perform a braking operation of the brake three times.

* * * * *